(12) United States Patent
Baeuerle et al.

(10) Patent No.: US 10,871,103 B2
(45) Date of Patent: Dec. 22, 2020

(54) METHOD FOR OPERATING AN ELECTRIC MACHINE, ELECTRIC MACHINE, DRIVE DEVICE AND COMPRESSOR AND/OR TURBINE

(71) Applicant: Robert Bosch GmbH, Stuttgart (DE)

(72) Inventors: Michael Baeuerle, Eberdingen (DE); Udo Sieber, Bietigheim (DE)

(73) Assignee: Robert Bosch GmbH, Stuttgart (DE)

(*) Notice: Subject to any disclaimer, the term of this patent is extended or adjusted under 35 U.S.C. 154(b) by 56 days.

(21) Appl. No.: 16/425,307

(22) Filed: May 29, 2019

(65) Prior Publication Data
US 2019/0383209 A1    Dec. 19, 2019

(30) Foreign Application Priority Data

Jun. 15, 2018 (DE) .................. 10 2018 209 705

(51) Int. Cl.
*F02B 37/10* (2006.01)
*F02B 33/40* (2006.01)

(52) U.S. Cl.
CPC .............. *F02B 37/10* (2013.01); *F02B 33/40* (2013.01)

(58) Field of Classification Search
CPC .......... F02B 37/04; F02B 33/40; Y02T 10/12; H02P 29/024; H02P 29/10; H02P 2203/00; H02P 2203/03; F02C 6/12
See application file for complete search history.

(56) References Cited

FOREIGN PATENT DOCUMENTS

DE    102017207532 A1    11/2018

*Primary Examiner* — Audrey K Bradley
*Assistant Examiner* — Edward Bushard
(74) *Attorney, Agent, or Firm* — Norton Rose Fulbright US LLP; Gerard Messina

(57) ABSTRACT

A method for operating an electric machine of a compressor and/or of a turbine, which includes a rotor situated on a shaft mounted rotatably in a housing and a stator fixed to the housing, the stator including an, in particular, multiphase drive winding, and an activation of the drive winding being suspended at least intermittently in an idling mode. It is provided that the shaft and/or the rotor is/are monitored for a rotary movement, and that, when a standstill or an impending standstill of the shaft and/or of the rotor is detected, the drive winding is activated in such a way that the rotor, at least briefly, is caused to carry out a movement and/or is centered with respect to the stator by magnetic force.

15 Claims, 4 Drawing Sheets

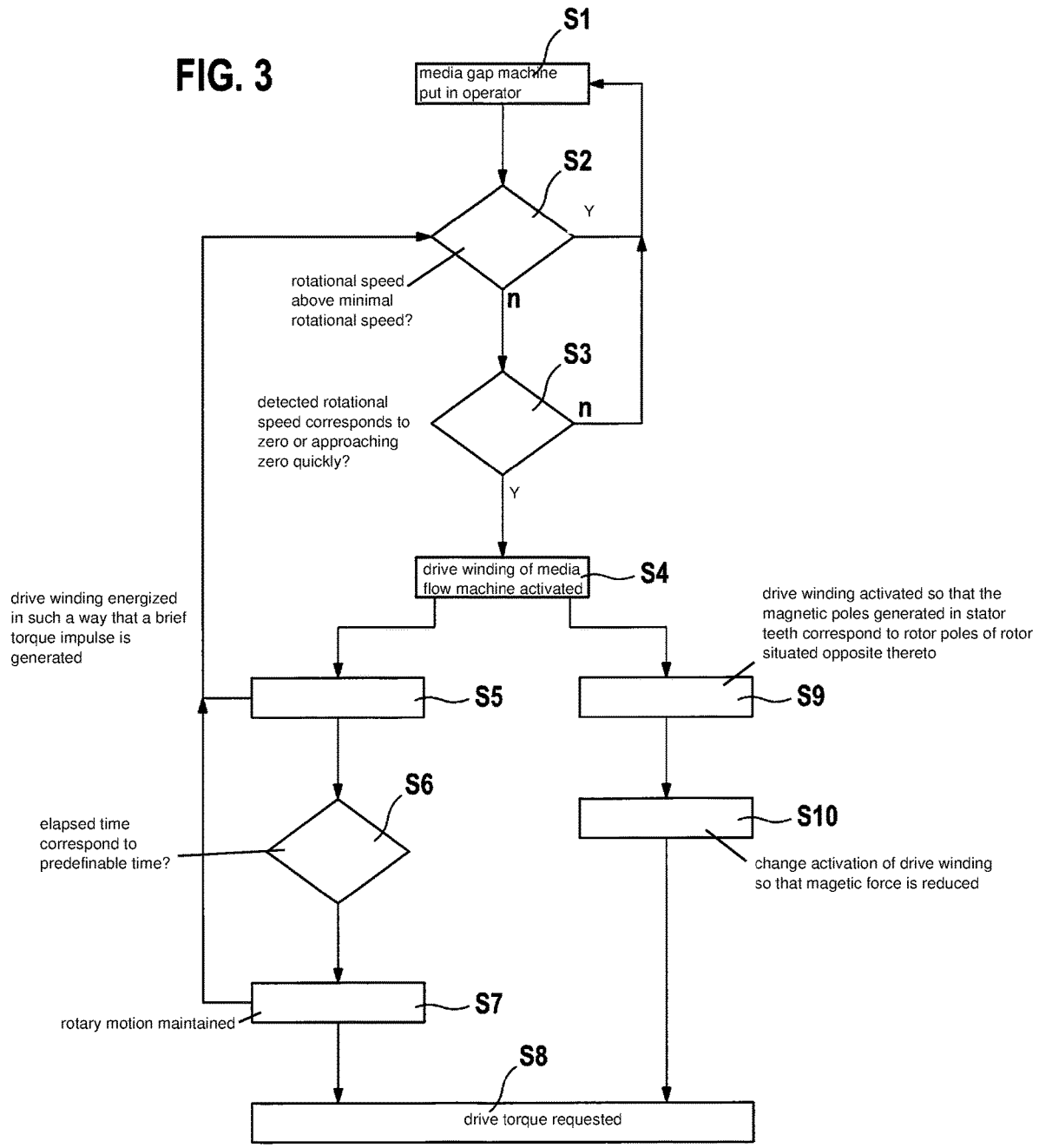

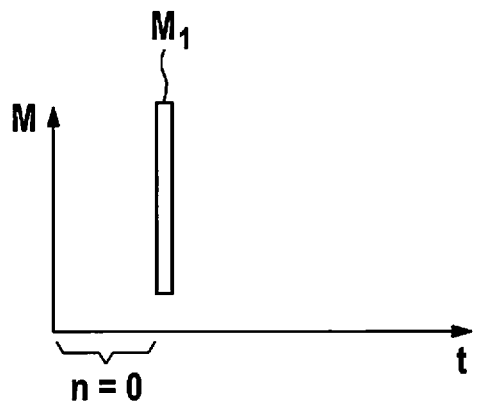
FIG. 4A
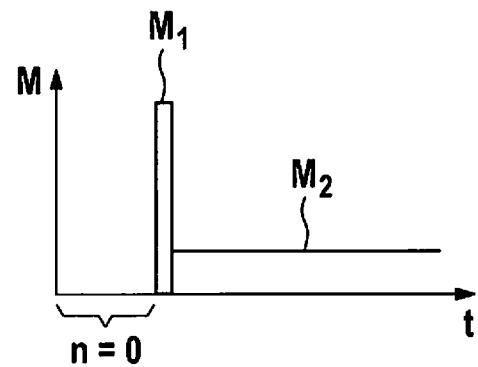
FIG. 4B
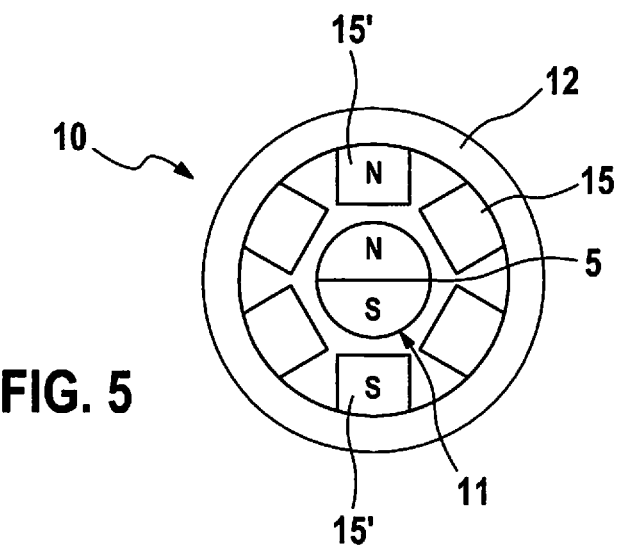
FIG. 5
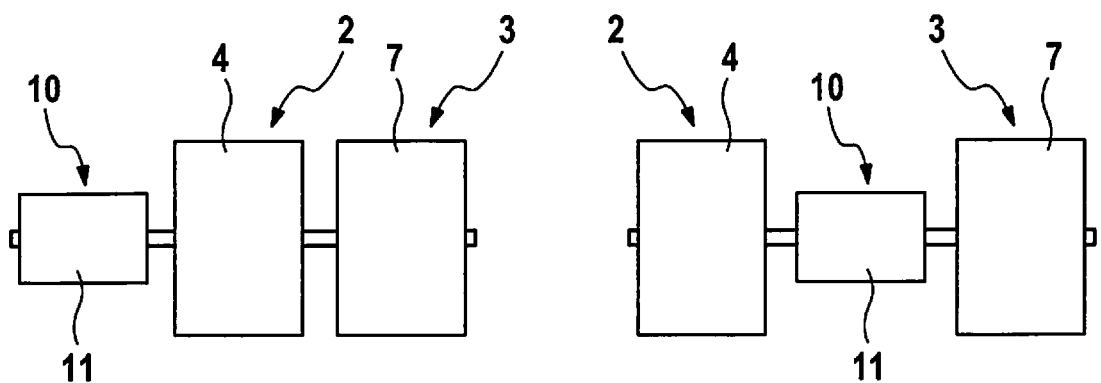
FIG. 6A
FIG. 6B

METHOD FOR OPERATING AN ELECTRIC MACHINE, ELECTRIC MACHINE, DRIVE DEVICE AND COMPRESSOR AND/OR TURBINE

CROSS REFERENCE

The present application claims the benefit under 35 U.S.C. § 119 of German Patent Application No. DE 102018209705.4 filed on Jun. 15, 2018, which is expressly incorporated herein by reference in its entirety.

FIELD

The present invention relates to a method for operating an electric machine of a compressor and/or of a turbine, which includes a rotor situated on a shaft mounted rotatably in a housing and a stator fixed to the housing, the stator including an, in particular, multiphase drive winding, and an activation of the drive winding being suspended at least intermittently in an idling mode.

Moreover, the present invention relates to a drive device for a compressor and its turbine, in particular for an exhaust gas turbocharger of an internal combustion engine, including an electric machine, which includes a rotor situated on a shaft mounted rotatably in a housing and a stator fixed to the housing, the stator including an, in particular, multiphase drive winding, and the shaft being rotatably fixedly connected to the compressor and/or the turbine, and including a control unit for activating the drive winding of the electric machine with the aid of the above-described method.

The present invention furthermore relates to a compressor and/or a turbine, in particular an exhaust gas turbocharger including a compressor and a turbine, for an internal combustion engine of a motor vehicle, including a shaft on which a compressor wheel and/or a turbine wheel is/are rotatably fixedly situated, and including a drive device coupled to the shaft for driving the compressor and/or the turbine, as was described above.

BACKGROUND INFORMATION

Methods, drive devices and compressors and/or turbines for internal combustion engines of motor vehicles are available in the related art. Turbochargers which include a compressor or a compressor and a turbine in the form of an exhaust gas turbocharger are used in motor vehicle engineering to increase the power of an internal combustion engine through an increased air charge in the combustion chambers of the internal combustion engine. When the compressor is driven by the exhaust gas of the internal combustion engine with the aid of the turbine, the rotational speed of the exhaust gas turbocharger or of the compressor depends on the exhaust gas flow of the internal combustion engine. If the compressor is present without the turbine, the compressor has to be driven separately by the exhaust gas flow, which requires an activatable drive device. Approaches in which the compressor is coupled to the internal combustion engine by a belt drive are also available. With the increasing electrification of motor vehicles, however, concepts have also been created in which an electric machine is assigned to the compressor and/or the turbine to be able to drive, in particular, the compressor at any time, independently from an operation of the internal combustion engine. In this way, it is achievable, for example, that the so-called turbo lag is overcome. Concepts are known in which the electric machine is coupled directly to the compressor and/or the turbine by a belt drive. Moreover, specific embodiments are known in which the rotor of the electric machine is situated rotatably fixedly on a shaft of the compressor or of the turbine carrying a compressor wheel and/or a turbine wheel. In principle, it is conceivable to situate the rotor on an extended shaft end of the shaft laterally next to the turbine wheel and the compressor wheel, if necessary also outside the housing. As an alternative, the rotor is situated centrally on the shaft between the compressor wheel and the turbine wheel.

In the resting state of the electric machine, which occurs during an idling mode, in particular, of the internal combustion engine including the compressor, in which a compression of the fresh air supplied to the internal combustion engine is not required or not necessary, asymmetrical magnetic forces, for example as a consequence of manufacturing tolerances, between the rotor and the stator, in addition to the additional weight force of the rotor acting on the shaft, result in an increased displacement force of the shaft in a radial direction. This may result in increased static friction or in a stick moment at the bearing exit points of the shaft, as a result of which the shaft or the turbine and/or the compressor may come to a halt at low rotational speeds, such as they may occur, for example, in the idling mode or in the resting state. A tilting of the rotor is also critical since relatively high stick/friction moments may arise on the bearings as a result of edge contacts. The detent torque of an electric machine designed as a permanently excited electric machine also contributes to increased static friction. Ultimately, this causes a delayed dynamic run-up of the compressor and/or of the turbine when increased air compression is required.

SUMMARY

An example method according to the present invention may have the advantage that a dynamic run-up of the compressor and/or of the turbine is ensured at any time, so that a desired compression of the fresh air is achievable or available within a very short time, which allows a highly dynamic operation of the internal combustion engine. According to the present invention, it is provided for this purpose that the shaft and/or the rotor is/are monitored for a rotary movement, and that, when a standstill or an impending standstill of the shaft and/or of the rotor is detected, the drive winding is activated in such a way that the rotor, at least briefly, is made to carry out a movement and/or is centered with respect to the stator by the magnetic force. Through the activation of the drive winding it is thus achieved that a standstill is prevented and/or the shaft or the rotor is at least briefly accelerated from the standstill, so that the compression is made available within a very short time by a dynamic run-up, in particular of the compressor, when an increased torque is requested. As an alternative or in addition, the drive winding is activated in such a way that the engine is centered with respect to the stator by the magnetic force generated by the drive winding. The rotor, together with the shaft, is thereby aligned with respect to the stator, so that it is prevented that the shaft, in a radial direction, causes an increased contact force on the respective bearing, which would lead to the increased friction moment or stick moment. As a result of the advantageous activation of the drive winding, it is achieved that the stick moment and the friction moment are the same or balanced, as viewed across the circumference of the shaft, and thus are minimal. In this way as well, a simple dynamic run-up, in particular of the compressor, is achieved when a used torque of the internal combustion engine is requested.

In particular, the drive winding is activated only briefly during a standstill or an impending standstill of the shaft. This reduces the energy expenditure and improves the energy efficiency of the method. In particular, in the case that the drive winding is activated for the purpose of causing the rotor to briefly carry out a movement, the drive winding is activated only briefly, for example only until the shaft has started to move and thus a detectable rotary movement is present. It is assumed that, due to the inertia of the shaft, the shaft continues to rotate at least for an expectable duration, until a standstill of the shaft is imminent, the drive winding being activated again then or when the standstill has occurred.

In particular, the shaft and/or the rotor is/are monitored for a rotary movement with the aid of at least one rotational speed sensor. This ensures an easy establishment of the standstill and/or of the rotary movement of the rotor and/or the shaft.

Preferably, the standstill is established when no rotary movement is ascertainable. This is the case, for example, when the rotational speed sensor does not detect or output any rotational speed signals.

The impending standstill is preferably established when a decreasing rotary movement of the shaft and/or of the rotor below a predefinable minimum rotational speed is identified. If, for example, the rotary movement further decreases below an idle rotational speed, it is assumed that the shaft and/or the rotor will shortly come to a halt, so that the impending standstill may be or is counteracted by the activation of the drive winding, as described above.

Preferably, the drive winding is activated to exert an in particular brief torque impulse onto the rotor. In this way, it is achieved that the shaft and/or the rotor is/are driven or made to carry out a rotary movement.

Moreover, it is preferably provided that the drive winding is activated to maintain a rotary movement generated by the torque impulse. In this way, it is achieved that an impending standstill of the shaft and/or of the rotor is reliably prevented, whereby the energy expenditure for starting to rotate the shaft and/or the rotor again is avoided. In this way, the energy balance of the method is improved. In particular, for maintaining the rotary movement, the drive winding is activated with a low amount of energy, in particular with a low current flow and/or a lower voltage than is necessary for driving the rotor and/or the shaft from the standstill.

Preferably, the drive winding is activated in such a way that the generated magnetic stator field causes magnetic poles of the stator teeth to correspond to opposing rotor poles, so that the mutually opposing magnetic poles and rotor poles repel one another. As usual, the stator is provided with stator teeth, which project radially inwardly in the direction of the rotor. The drive winding is placed or situated around the stator teeth. During operation, a positive or negative magnetic pole, which is used to drive the electric machine, is generated in the stator teeth by the magnetic flow through the stator teeth. In particular, to achieve the centering of the shaft with respect to the stator, the drive winding is now activated in such a way that the respective generated magnetic pole corresponds to an opposing rotor pole of the rotor so that, for example, a positive magnetic pole is situated opposite a positive rotor pole, whereby these two poles repel one another. With this repulsion, it is achieved that a radial force acts upon the rotor and the shaft. In particular, when the drive winding is activated in such a way that all magnetic poles correspond to opposing rotor poles, it is achieved that the shaft is centered with respect to the stator, or the rotor is centered with respect to the stator, whereby, as was already described above, low stick or friction moments are also achieved when the shaft is at a standstill.

Preferably, an onset of the rotary movement of the rotor and/or of the shaft causes the stator field to rotate together with the rotor. In this way, it is achieved that the shaft continues to be centered with respect to the stator, even during a rotary movement, in particular of the shaft, and a low stick or friction moment is thereby ensured.

Particularly preferably, the generated stator field is reduced with increasing rotary movement of the rotor since, due to the increasing rotary movement, the shaft is self-centered with respect to the stator and the stick or friction moments decrease. This reduces the energy expenditure and improves the energy balance.

The electric machine is preferably designed as a media flow machine, which includes a housing having a media inlet and a media outlet, a shaft mounted rotatably in the housing, a rotor situated rotatably fixedly on the shaft and a stator fixed to the housing, which includes a drive winding and multiple stator teeth projecting radially inwardly, an inner sleeve circumferentially surrounding the rotor and an outer sleeve situated coaxially to the rotor, due to the stator teeth extending through the outer sleeve at least up to the inner sleeve, the inner sleeve and the outer sleeve {and] multiple flow channels leading through the stator as the only through-flow paths through the media flow machine for the medium flowing from the media inlet to the media outlet being formed. In this way, in particular, an integration of the electric machine into the flow path of the medium to be compressed is achieved. For this purpose, the media flow machine is situated, in particular, in the compressor, the housing of the media flow machine forming part of or forming the air duct of the compressor. In this way, a particularly space-saving integration of the media flow machine into the compressor and/or the turbine, in particular into the exhaust gas turbocharger, is ensured.

An example drive device according to the present invention may include a control unit which is specifically configured to carry out the method according to the present invention. This results in the aforementioned advantages.

The electric machine is particularly preferably designed as a media flow machine, as it was already described above. This results in the aforementioned advantages.

The compressor according to the present invention and/or the turbine according to the present invention or the turbo-charger according to the present invention is/are characterized by the design according to the present invention of the drive device. This also results in the aforementioned advantages.

Further advantages and preferred features and feature combinations result from the description herein. The present invention is to be described in greater detail hereafter based on the figures.

BRIEF DESCRIPTION OF THE DRAWINGS

FIG. 3 shows an advantageous method for operating the media flow machine.

FIGS. 4A and 4B show diagrams to explain the advantageous method.

FIG. 5 shows a simplified cross-sectional illustration of the media flow machine to explain the method.

FIGS. 6A and 6B show further exemplary embodiments of the exhaust gas turbocharger.

DETAILED DESCRIPTION OF EXAMPLE EMBODIMENTS

Figure 1:
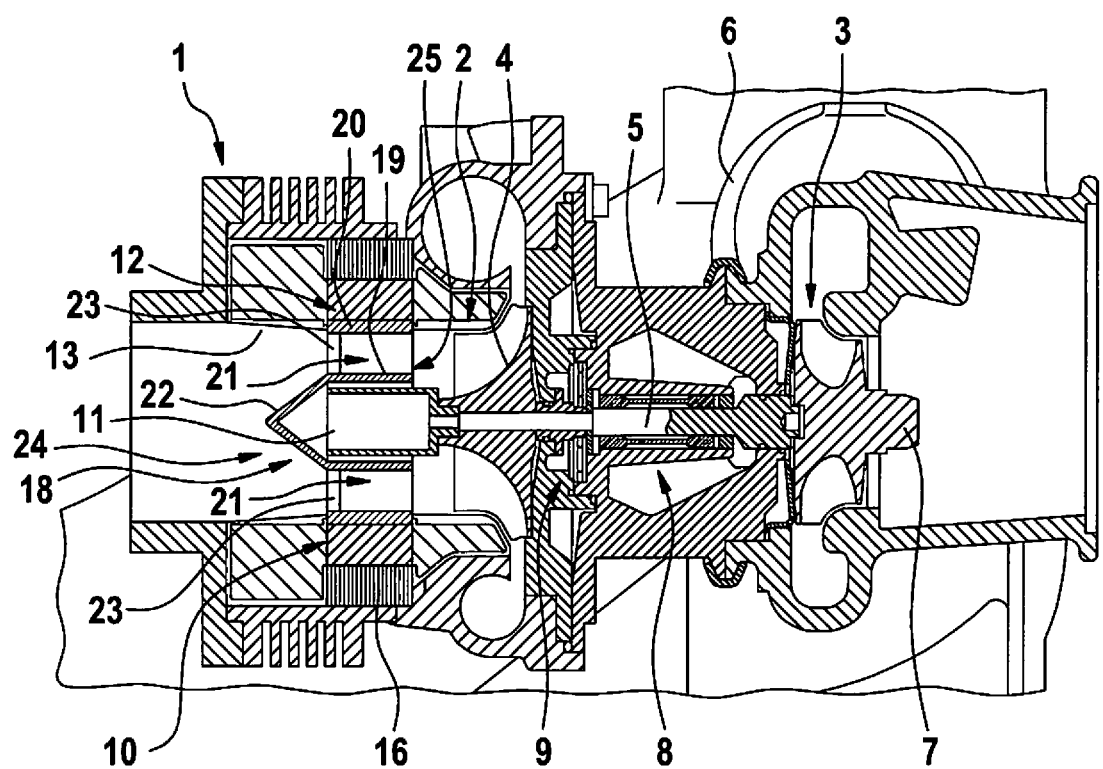
FIG. 1 shows an exhaust gas turbocharger including a media flow machine in a simplified longitudinal sectional illustration.

FIG. 1 shows an exhaust gas turbocharger 1 in a simplified longitudinal sectional illustration, which includes a compressor 2 and a turbine 3. Compressor 2 includes a compressor wheel 4 which is rotatably fixedly situated on a shaft 5. Shaft 5 itself is mounted rotatably in a housing 6 of exhaust gas turbocharger 1. At an end of shaft 5 facing away from compressor wheel 4, additionally a turbine wheel 7 of turbine 3 is rotatably fixedly connected to shaft 5. When the exhaust gas of an internal combustion engine flows against turbine wheel 7, thereby driving it, compressor wheel 4 is also caused to carry out a rotary movement, so that fresh air supplied to the compressor wheel 4 is compressed and supplied to the internal combustion engine.

The rotatable mounting of shaft 5 in housing 6 may be implemented in different ways. According to a first exemplary embodiment, it is provided that shaft 5 is rotatably mounted in housing 6 with the aid of at least two bearings 8 and 9. Preferably, two rolling element bearings are present as bearings 8, 9. For the axial mounting of shaft 5, it may also be provided that one of the rolling element bearings is designed as an axial rolling element bearing.

As an alternative and according to the exemplary embodiment shown in FIG. 1, it is provided that bearing 8 is designed as a magnetic bearing, and bearing 9, which serves as an axial bearing, is designed as a rolling element bearing.

To ensure that, in particular, compressor 2 is drivable independently from the exhaust gas flow of the internal combustion engine, so that a high cylinder air charge may be achieved in the cylinders of the internal combustion engine at any time, it is also provided in the present example that exhaust gas turbocharger 1 includes an electric media flow machine 10. In the present example, it is integrated into compressor 2, a rotor 11 of media flow machine 10 being situated rotatably fixedly on the end of shaft 5 facing away from turbine wheel 7. A stator 12 cooperating with rotor 11 is situated coaxially to rotor 11 and fixed to the housing in flow channel 13 of exhaust gas turbocharger 1 leading to compressor wheel 4.

Figure 2:
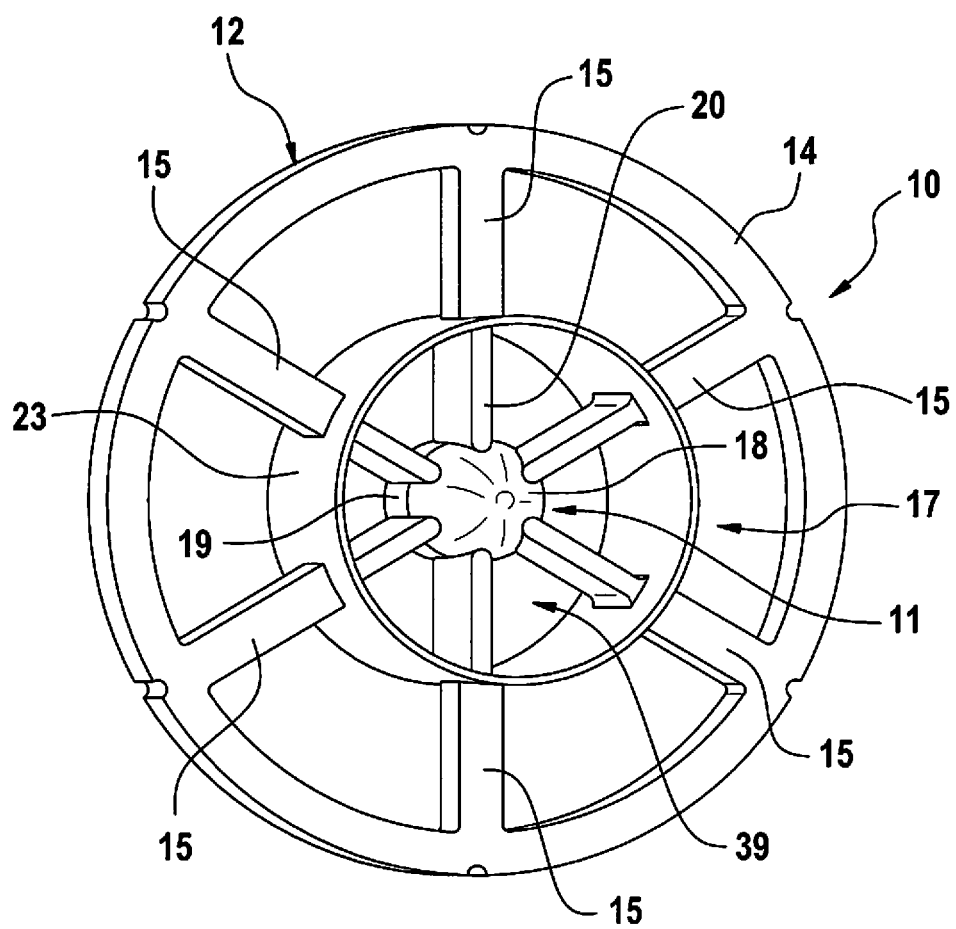
FIG. 2 shows a perspective representation of the media flow machine.

FIG. 2 shows a simplified perspective representation of media flow machine 10. Stator 12 includes a circular ring-shaped stator yoke 14, from which multiple stator teeth 15, which are evenly distributed over the circumference of stator yoke 14, project radially inwardly and point in the direction of rotor 11. Stator teeth 15 end radially spaced apart from rotor 11, so that a respective axial air gap 16 remains between stator teeth 15 and rotor 11.

Stator 12 is provided with an, in particular, multi-phase drive winding 17, as is also shown in FIG. 1, for example. Drive winding 17 may be designed as a winding wound over the stator or a winding pushed radially onto stator teeth 15, in particular made up of multiple coils, at least one coil being pushed onto each stator tooth, as is described in German Patent Application No. DE 10 2017 207 532, for example.

Media flow machine 10 furthermore includes a device 18 which is designed to optimize the flow behavior of the medium delivered by exhaust gas turbocharger 1, i.e., in particular the fresh air, through media flow machine 10. For this purpose, device 18 includes an inner sleeve 19, which is assigned to rotor 11 and whose inside diameter is larger than rotor 11, so that the rotor is accommodated in inner sleeve 19, as is shown in FIG. 2, for example, and is situated therein without contact, so that rotor 11 is able to rotate without wear inside inner sleeve 19. Inner sleeve 19 is attached to stator 12, so that inner sleeve 19 is present in a manner fixed to the housing.

Device 18 moreover includes an outer sleeve 20, which is situated coaxially to rotor 11 or to the rotary axis of shaft 5 and has an inside diameter which is larger than the outside diameter of inner sleeve 19, so that outer sleeve 20 is attached on stator 12, in particular on stator teeth 15, spaced radially outwardly apart from inner sleeve 19.

Outer ring 20 has an outside diameter which is smaller than the inside diameter of stator yoke 14, so that clearances between the adjoining stator teeth 15, in which stator winding 17 is situated or formed, are present between outer ring 20 and stator yoke 14. Drive winding 17 is protected against the medium by outer sleeve 20, but is nonetheless cooled via the sleeve.

Stator teeth 15 extend through outer sleeve 20 to inner sleeve 19, so that multiple flow channels 21 are formed between inner sleeve 19, stator teeth 15 and outer sleeve 20, through which the medium flows through media flow machine 10. Flow channels 21 form, in particular, the only flow paths through which the medium is able to penetrate media flow machine 10. Preferably, a cover cap 22 is assigned to rotor 11 upstream for this purpose, which covers rotor 11 upstream and, in particular, has a flow-optimized design to guide the medium into flow channels 21.

In contrast to conventional media gap machines, the media path is thus not situated radially between the stator tooth and the rotor, but is provided by flow channels 21 in stator 12 itself, so that the medium flows completely through stator 12. In this way, a particularly advantageous stator cooling takes place, and the deposition of magnetic and/or magnetizable particles on the rotor is prevented or at least essentially avoided.

According to the present exemplary embodiment, inner sleeve 19 and outer sleeve 20 have a cylindrical design, so that they extend overall coaxially or in the flow direction in parallel to the rotary axis of shaft 5 or of rotor 11, as is apparent, in particular, in FIG. 1.

Cover cap 22 has a conical or ovoid longitudinal section and on its outer circumference transitions into the inner sleeve, in particular in one piece. Moreover, cover cap 22 includes holding struts 23, which extend radially outwardly and are each assigned to one of stator teeth 15 in such a way that they cover stator tooth 15 in the area of flow channels 21 upstream. Holding struts 23 are moreover connected to outer sleeve 20, in particular formed in one piece therewith, and thus ensure the cohesion of cover cap 22, inner sleeve 19 and outer sleeve 20.

FIG. 3, in a flow chart, shows an advantageous method for operating the electric machine. In a step S1, media gap machine 10 is put into operation. To achieve a higher air charge in the combustion chambers of the internal combustion engine, media flow machine 10 is activated by a motor, so that compressor 2 is driven essentially independently from the exhaust gas flow. However, if no torque is requested, an idling phase or an idling state arises, in which it is not necessary to drive compressor 2 by an electric motor. However, when the internal combustion engine is in the idling phase, the existing exhaust gas flow may possibly no longer suffice to drive shaft 5 of exhaust gas turbocharger 1 by turbine 7. To enable an easy start of exhaust gas turbocharger 1 or a dynamic run-up at any time, in which static or friction moments, which may occur due to the mounting of shaft 5 in housing 6, are avoided, the method described hereafter is carried out. Initially, in a step S2, the rotational speed of shaft 5, and thus the rotational speed of rotor 11, is monitored with the aid of a rotational speed sensor. In this process, a distinction is made whether rotational speed n is above a predefined minimum rotational speed no, or below predefined minimum rotational speed no. If rotational speed n of shaft 5 is above predefined minimum rotational speed $n_0$ ($n>n_0$), reference is made back to step S1 and to the conventional activation of the media flow machine. However, if rotational speed n corresponds to the minimum rotational speed or is below it ($n \leq n_0$) (n), reference is made to a further query in a step S3.

In step S3, it is checked whether the detected rotational speed n corresponds to zero (n=0) or approaches zero so quickly that an impending standstill of shaft 5 is to be expected shortly. If neither an impending standstill nor a standstill of shaft 5 is established (n), reference is also made back to step S1. However, if it is established that shaft 5 is neither at a halt nor at risk of being at a halt shortly (j), reference is made to a subsequent step S4, in which drive winding 17 of media flow machine 10 is activated to enable an advantageous run-up of media flow machine 10 and of exhaust gas turbocharger 1. For this purpose, at least one of two variants is selected in step S4.

In the first variant, initially in a step S5 drive winding 17 is energized in such a way that a brief torque impulse is generated, which acts on rotor 11 so that shaft 5 is caused to carry out a rotary movement. Thereafter, reference is made back to step S2, and the generated rotational speed or rotary movement of shaft 5 is monitored. At the same time, a time signal is detected with the point in time of the torque impulse, and the time starting from the triggering of the torque impulse is counted. In a step S6, it is checked whether the time which has already elapsed corresponds to a predefinable time. Only when the predefinable duration has been reached is the activation of drive winding 17 changed in such a way, in a subsequent step S7, that the energy is reduced, in particular provided that rotational speed n still satisfies the requirements of steps S2 and S3. Due to the now lower energy supply, it is achieved that shaft 5 continues to be rotated and thereby the moment of force or friction moment which would have to be overcome to drive shaft 5 from the standstill is avoided. In step S7, the rotary movement which was generated by the torque impulse is thus maintained, at least until a further request for a torque occurs in a step S8, which requires an increased compression of the fresh air by compressor 2.

FIGS. 4A and 4B each show a diagram in this regard in simplified form, in which torque M of media flow machine 10 is plotted over time t. Proceeding from the rotational speed=0, a torque is generated by the torque impulse $M_1$ to cause shaft 5 to carry out a rotary movement. Preferably, only a short torque impulse is emitted, so that shaft 5 has a decreasing rotational speed after the torque impulse has occurred. To avoid that shaft 5 comes to a halt, as was already described above, drive winding 17, after expiration of a predefinable time period/duration or directly subsequent to torque impulse $M_1$, is activated to maintain a torque M2 which prevents the standstill of shaft 5.

As an alternative or in addition to the first variant, in the second variant, in a step S9, drive winding 17 is activated so that the magnetic poles generated in stator teeth 15 correspond to the rotor poles of rotor 11 situated opposite thereto, so that the magnetic poles repel one another. In this way, it is achieved that shaft 5 is centered in housing 6, whereby the radial contact force in the bearings of the shaft is uniformly distributed over the circumference, and no increased static friction exists from the dead weight of rotor shaft 5. In this way, easy revving-up of shaft 5 is possible with little force expenditure when shaft 5 is started to be driven by media flow machine 10. Preferably, the generated stator field or the arrangement of the magnetic poles of the stator is also moved when a rotary movement of the shaft 5 takes place, so that, at least at low rotational speeds, the desired centering of shaft 5 is maintained by the activation of drive winding 17.

FIG. 5 shows, in this regard, media flow machine 10 together with stator 12, whose stator teeth 15 are distributed around rotor 11, in a simplified cross-sectional illustration. In the present example, rotor 11 has two magnetic poles N and S. Drive winding 17 is activated in such a way that magnetic poles N and S of stator teeth 15' situated opposite these poles N and S are generated in such a way that they have the same polarity as the rotor poles, whereby the rotor poles and stator teeth 15' or magnetic poles repel one another, and thereby center shaft 5 or rotor 11 with respect to stator 12, and thus with respect to housing 6 or its mounting of rotor shaft 5.

In a step S10, the activation of drive winding 17 is changed in such a way that the magnetic force is reduced, and the centering of shaft 5 is canceled with increasing rotational speed, since the shaft self-centers with increasing rotational speed, and the dead weight of the rotor has a lesser influence on the static friction or the friction moment. If, in step S8, a drive torque is requested from media flow machine 10 since a higher torque of the internal combustion engine is required, the centering of shaft 5 is preferably canceled, and media flow machine 10 is driven by a motor, and the rotational speed of shaft 5 is increased corresponding to the request for the torque.

While, according to the present exemplary embodiment, media flow machine 10 is situated in the flow path and the fresh air, and as a result is integrated into exhaust gas turbocharger 1 in a particularly compact manner, it is provided according to one further exemplary embodiment that media flow machine 10 is situated as a simple electric machine outside housing 6 of exhaust gas turbocharger 1, and thereby is no longer situated in the flow path.

In this regard, FIGS. 6A and 6B show exemplary embodiments of exhaust gas turbocharger 1, in which the above-described method may also be applied. For this purpose, FIGS. 6A and 6B each show rotor shaft 5 together with rotor 11, compressor wheel 4 and turbine wheel 7.

According to the exemplary embodiment of FIG. 6A, rotor 11 is situated, as in the exemplary embodiment of FIG. 1, on a free end of shaft 5, next to compressor wheel 4 and turbine wheel 7, preferably however outside the housing. According to the exemplary embodiment of FIG. 6B, it is provided that electric machine 10 or rotor 11 is situated between compressor wheel 4 and turbine wheel 7 on shaft 5. In both instances, the drive device is designed as a simple electric machine in this case, which does not provide a media flow channel.

What is claimed is:

1. A method for operating an electric machine of a compressor and/or of a turbine, which includes a rotor situated on a shaft mounted rotatably in a housing and a stator fixed to the housing, the stator including a multiphase drive winding, and an activation of the drive winding being suspended at least intermittently in an idling mode, the method comprising:

monitoring the shaft and/or the rotor for a rotary movement;

detecting a standstill or an impending standstill of the shaft and/or of the rotor and, based on the detecting, activating the drive winding in such a way that the rotor, at least briefly, is made to carry out a movement and/or is centered with respect to the stator by magnetic force.

2. The method as recited in claim 1, wherein the drive winding is activated only briefly during the standstill or the impending standstill of the shaft.

3. The method as recited in claim 1, wherein the shaft and/or the rotor is monitored for a rotary movement using at least one rotational speed sensor.

4. The method as recited in claim 1, wherein the standstill is established when no rotary movement is ascertainable.

5. The method as recited in claim 1, wherein the impending standstill is detected when a decreasing rotary movement of the shaft and/or of the rotor below a predefinable minimum rotational speed is identified.

6. The method as recited in claim 1, wherein the drive winding is activated to exert a torque impulse onto the rotor.

7. The method as recited in claim 1, wherein the drive winding is activated to maintain a rotary movement generated by the torque impulse.

8. The method as recited in claim 1, wherein the drive winding is activated in such a way that a generated magnetic stator field causes magnetic poles of the stator teeth to correspond to opposing rotor poles of the rotor, so that the mutually opposing magnetic poles and rotor poles repel one another.

9. The method as recited in claim 8, wherein the generated stator field is rotated together with the rotor during an onset of the rotary movement of the rotor and/or of the shaft.

10. The method as recited in claim 8, wherein the generated stator field is reduced with increasing rotary movement of the rotor.

11. The method as recited in claim 1, wherein the electric machine is a media flow machine, which includes a housing having a media inlet and a media outlet, the shaft mounted rotatably in the housing, the rotor situated rotatably fixedly on the shaft and the stator fixed to the housing, which includes the drive winding and multiple stator teeth projecting radially inwardly, and an inner sleeve circumferentially surrounding the rotor and an outer sleeve situated coaxially to the rotor, due to the stator teeth extending through the outer sleeve at least up to the inner sleeve, the inner sleeve and the outer sleeve and multiple flow channels leading through the stator as the only through-flow paths through the media flow machine for the medium flowing from the media inlet to the media outlet, being formed.

12. A drive device for a compressor and/or a turbine in an exhaust gas turbocharger, comprising:

an electric machine which includes a rotor situated on a shaft rotatably mounted in a housing and a stator fixed to the housing, the stator including a multi-phase drive winding and the shaft being rotatably fixedly connected to the compressor and/or the turbine; and a control unit configured to activate the drive winding of the electric machine, the control unit being configured to monitor the shaft and/or the rotor for a rotary movement, and when a standstill or an impending standstill of the shaft and/or of the rotor is detected, activate the drive winding in such a way that the rotor, at least briefly, is made to carry out a movement and/or is centered with respect to the stator by magnetic force.

13. The drive device as recited in claim 12, wherein the electric machine is designed as a media flow machine, which includes a housing having a media inlet and a media outlet, the shaft being mounted rotatably in the housing, the rotor situated rotatably fixedly on the shaft and the stator fixed to the housing, which includes the drive winding and multiple stator teeth projecting radially inwardly, and an inner sleeve circumferentially surrounding the rotor and an outer sleeve situated coaxially to the rotor, due to the stator teeth extending through the outer sleeve at least up to the inner sleeve, the inner sleeve and the outer sleeve and multiple flow channels leading through the stator as the only through-flow paths through the media flow machine for the medium flowing from the media inlet to the media outlet, being formed.

14. A compressor and/or a turbine for an internal combustion engine, comprising:

a shaft, on which a compressor wheel and/or a turbine wheel is/are rotatably fixedly situated;

a drive device coupled to the shaft for driving the compressor and/or the turbine wheel, the drive device including an electric machine which includes a rotor situated on the shaft rotatably mounted in a housing and a stator fixed to the housing, the stator including a multi-phase drive winding; and a control unit configured to activate the drive winding of the electric machine, the control unit being configured to monitor the shaft and/or the rotor for a rotary movement, and when a standstill or an impending standstill of the shaft and/or of the rotor is detected, activate the drive winding in such a way that the rotor, at least briefly, is made to carry out a movement and/or is centered with respect to the stator by magnetic force.

15. The compressor and/or turbine as recited in claim 14, wherein the compressor and/or the turbine is for an exhaust gas turbocharger of the internal combustion engine.

* * * * *